United States Patent

[11] 3,555,291

| [72] | Inventor | Clyde G. Dewey |
| | | Drexel Hill, Pa. |
| [21] | Appl. No. | 729,638 |
| [22] | Filed | May 16, 1968 |
| [45] | Patented | Jan. 12, 1971 |
| [73] | Assignee | General Electric Company |
| | | a corporation of New York |

[54] POWER SYSTEM FILTER
7 Claims, 2 Drawing Figs.

[52] U.S. Cl. ..................................................... 307/105,
321/9, 333/76
[51] Int. Cl. ..................................................... H02j 1/02
[50] Field of Search ........................................... 307/105;
321/9; 333/79, 76

[56] References Cited
UNITED STATES PATENTS

| 2,682,037 | 6/1954 | Bobis et al. | 333/76X |
| 2,959,738 | 11/1960 | Nagai | 307/105X |
| 3,290,578 | 12/1966 | Ainsworth | 333/76X |
| 2,241,831 | 5/1941 | Wahlquist | 307/105 |
| 2,636,997 | 4/1953 | Hibbard | 307/105 |
| 3,038,134 | 6/1962 | Forssell | 333/79 |
| 3,249,811 | 5/1966 | Price et al. | 307/105X |

*Primary Examiner*—Robert K. Schaefer
*Assistant Examiner*—T. B. Joike
*Attorneys*—J. Wesley Haubner, Albert S. Richardson, Jr., Melvin M. Goldenberg, Frank L. Neuhauser and Oscar B. Waddell ABSTRACT: A harmonic filter for an AC power system, particularly for converter installations, which provides damping to diminish the effects of parallel resonance. The filter consists of a plurality of conventional LC shunt filters tuned to the expected harmonic frequencies. The power system may also include static capacitors for power factor correction. Since the power factor capacitors and the harmonic filters are effectively in parallel with the inherent inductance of the AC system, a parallel resonance, which may occur at one of the lower harmonic frequencies, results. In order to reduce the effects of a parallel resonance, there is provided an additional filter tuned to provide damping at the harmonic frequency at which parallel resonance may occur. This additional filter comprises an LC filter with a resistor connected in parallel with the inductance. This resistor is connected to a blocking filter which presents a high impedance to the system fundamental frequency. The effect of this resistor is to provide damping which will reduce the amplitude of oscillations under parallel resonant conditions. Since this resistor is connected through a blocking filter, it provides damping without providing excessive additional loading at the fundamental frequency.

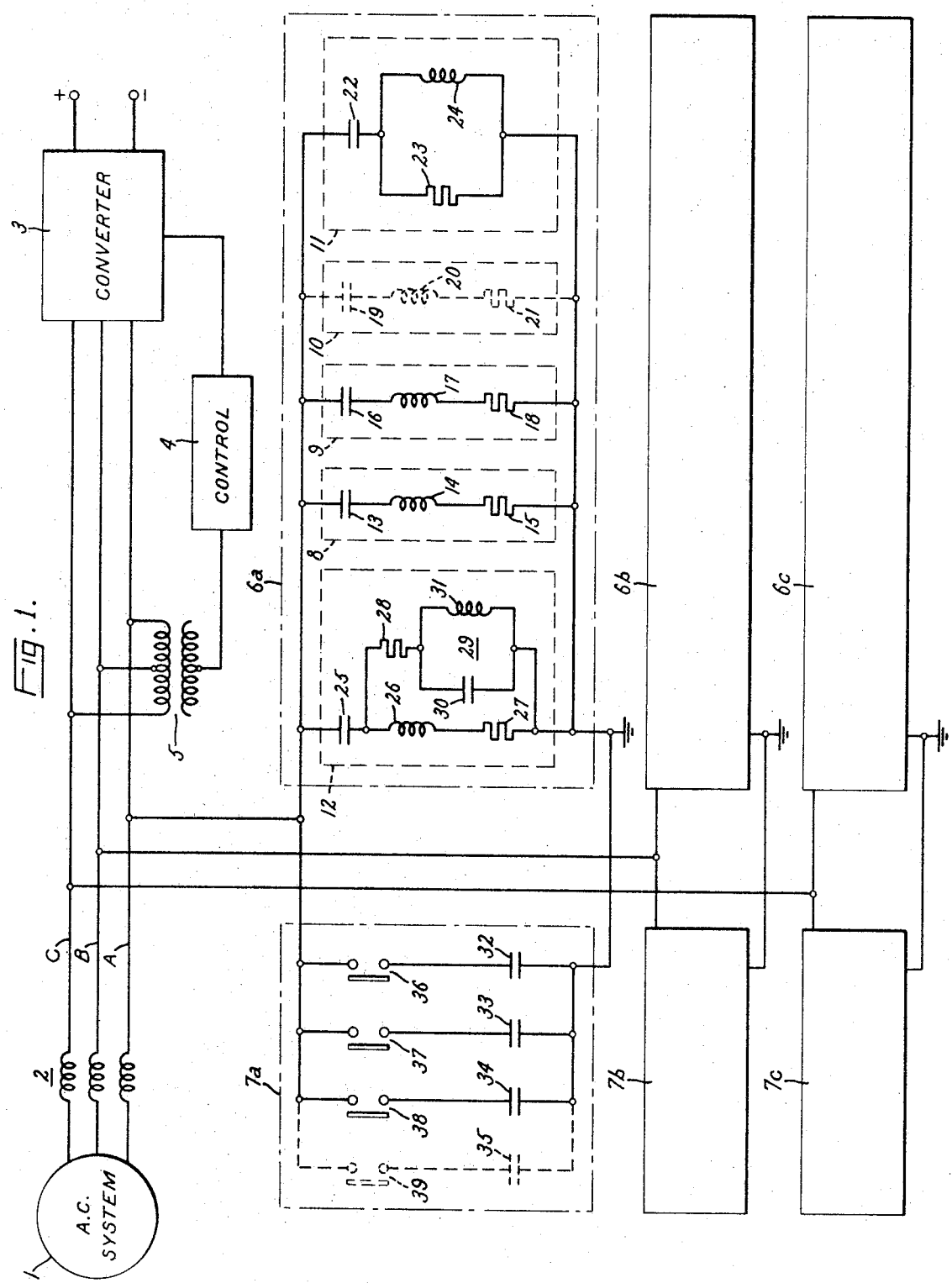

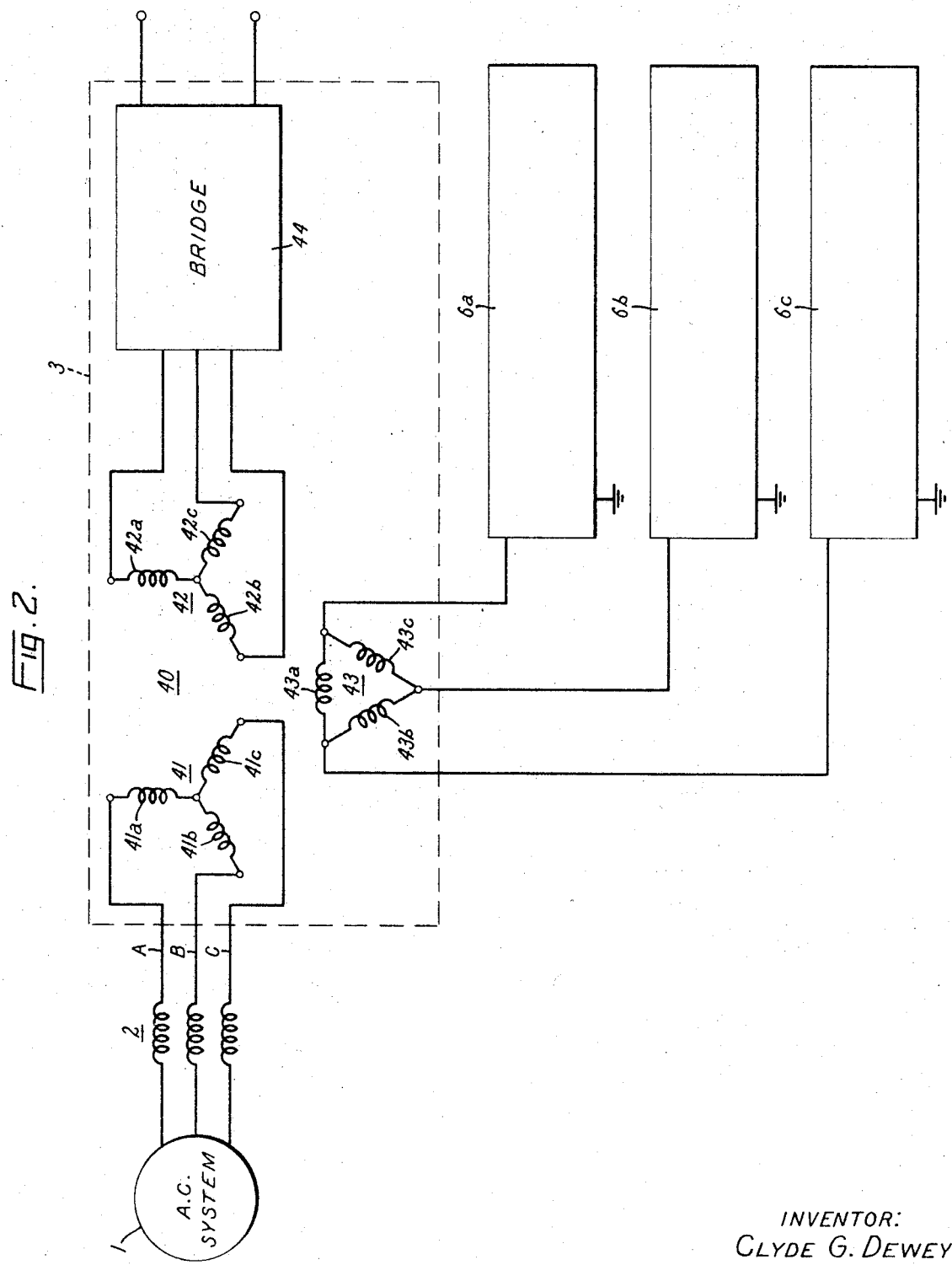

POWER SYSTEM FILTER

BACKGROUND OF THE INVENTION

This invention relates to filters associated with alternating current power systems. More specifically, the invention relates to filters for removing harmonic frequencies.

In AC power systems it is often desirable to filter out undesired harmonic frequencies. This desire may be heightened by virtue of the fact that certain types of equipment tend to accentuate harmonic frequency components. These harmonic components are undesirable in that they may give rise to interference with neighboring telephone and telegraph systems. In addition, the presence of harmonic components may cause damage or improper operation of electrical equipment connected to the power system.

A high voltage direct current transmission system generally comprises a direct current link between two alternating current systems. The conversions from AC to DC at one terminal and from DC to AC at the other terminal are accomplished by electrical equipment referred to broadly as converters. A converter will operate as either a rectifier or an inverter depending upon the type of conversion desired. Known converters comprise, for example, the combination of a polyphase power transformer and a three-phase bridge composed of controllable valves of either conventional or solid state design. It can be shown that operation of the bridge results in alternating current in each phase of the transformer having a nonsinusoidal waveform which is the composite of a primary sinusoidal component of fundamental frequency and a large number of harmonic components. These harmonics include all those of the order of $N = 6K \pm 1$, where K is a positive integer, and N times the fundamental frequency yields the harmonic frequency. These harmonics are often referred to as the characteristic harmonics.

In addition to the characteristic harmonics, other harmonic components may be present under certain circumstances. While the magnitude of these noncharacteristic harmonics is in general proportionally smaller than the magnitude of the characteristic harmonics, they may still be too large to be ignored.

In order to suppress the characteristic harmonics, it is well known etc., provide a plurality of LC shunt filter circuits, individually tuned to provide a low impedance for the predetermined individual frequencies to be suppressed. However, when such filter circuits are provided, they may cause other undesirable effects. At frequencies below that for which such a filter is tuned, the dominant impedance will be that of the capacitive element. This impedance may interact with the inherent inductance of the power system to produce a parallel resonance. If this parallel resonance should occur at a noncharacteristic harmonic frequency, then even a relatively small component of current at that frequency may produce a large harmonic distortion of the system voltage. Since the inherent inductance of the power system varies with the connected generation, load, etc., it is not always possible to accurately predict the parallel resonant harmonic frequency.

In addition, for similar reasons, the propensity of the system to go into parallel resonance at a noncharacteristic harmonic frequency may be further aggravated when static capacitors are utilized for power factor correction. For this reason, it has often been necessary to utilize synchronous condensers, rather than static capacitors, for power factor correction. This requirement adds significant expense to the system since synchronous condensers are costlier than static capacitors.

An additional undesirable result of harmonic frequencies comes about when the power system includes a converter which is operated by some type of control system. Since the control system determines the operation of the converter by examining the current and voltage on the AC side, by significant distortions in the AC voltage will affect the operation of the control system. Further, since the control system is connected to the AC line and the converter, it forms part of a closed loop which may become regenerative under certain conditions. Hence, parallel resonance at noncharacteristic harmonic frequencies may be accentuated due to the presence of the control system on the power system.

SUMMARY OF THE INVENTION

It is an object of the present invention to filter harmonic frequencies in power systems and avoid the dangers of parallel resonance.

It is a further object of the present invention to diminish the effects of parallel resonant conditions without significantly adding to losses at the system fundamental frequency.

It is a still further object of the present invention to provide for damping excessive parallel resonance thereby allowing the use of static capacitors for power factor correction.

According to the present invention, the characteristic harmonic frequencies are filtered in conventional fashion. In addition, the invention adds damping to the system so as to reduce the effects of parallel resonance at noncharacteristic harmonic frequencies without adding significant losses at the system fundamental frequency.

DESCRIPTION OF THE DRAWINGS

While the specification concludes with claims particularly pointing out what is considered to be the invention, reference to the attached drawings in conjunction with the specification, will illustrate the particular embodiments thereof.

FIG. 1 is a schematic circuit diagram of an AC power system embodying the invention.

FIG. 2 illustrates a similar power system wherein the invention is coupled to the AC lines by way of a power transformer.

DESCRIPTION OF THE PREFERRED EMBODIMENTS

Turning now to FIG. 1, there is symbolically shown a three-phase AC power system 1 and an electric power converter 3 interconnected by a set of three conductors A, B, and C. The conductors are energized by alternating current having a given fundamental frequency (e.g., 60 hertz), and system inductances, lumped generally at 2, are illustrated in series therewith. The converter 3 is controlled by control means 4 which is tied to the AC conductors by a transformer shown generally at 5. The converter 3 may be operated as a rectifier for supplying power via a high voltage direct current transmission line from an AC source associated with the system 1 to a remote load (not shown). Alternatively, the same converter 3 can operate as an inverter in which case power is supplied from a remote source to the AC system 1 and its associated feeder lines (not shown).

Connected directly to each phase of the power system, there are shown harmonic filters 6a, 6b, 6c for filtering out characteristic harmonic frequencies. Harmonic filters 6a, 6b, 6c are shown connected between the conductors A, B, C and system ground. It should be pointed out that certain applications may require connection of these filters across the conductors, i.e., from phase to phase, rather than from phase to ground as shown. In addition, there is shown means for correcting the system power factor such as the bank of static capacitors shown at 7a, 7b, 7c.

Referring specifically to harmonic filter 6a, there is shown a series of conventional LC shunt filters 8, 9, and 10 of the well-known series resonance type. These filters are selected to shunt out individual characteristic harmonic frequencies. Accordingly, filter 8 may be specifically designed to filter out fifth harmonic while filter 9 may be designed to filter out the seventh harmonic. As is well known, additional filters are provided for other specified harmonic frequencies such as the 11 th and 13 th, the 17 th and 19 th and so on. These additional filters are represented by filter 10 which is shown in dotted lines to indicate that any number of individual LC filters may be provided according to the needs of the particular system. Finally, there is shown a high pass filter 11 which is designed to present a low impedance to any harmonic frequencies above the highest frequency for which an LC filter is provided. Harmonic filter systems of the type described thus far are well known in the art and do not comprise the present invention. In accordance with the present invention, there is provided an additional filter 12 which will add damping to the system in order to diminish the effects of parallel resonant conditions.

Referring specifically to the conventional LC shunt filter 8, this filter is seen to comprise a capacitor 13 in series with an inductor 14. The resistance shown at 15 represents the DC resistance of the inductor 14 and is made as small as possible in the construction of inductor 14 in order to minimize the "Q" of the filter. As was pointed out above, capacitor 13 and inductor 14 will be sized (tuned) so as to present a low impedance to a certain predetermined characteristic harmonic frequency such as, for example, the fifth harmonic. Similarly, filter 9 is constructed of capacitor 16 in series with inductor 17 whose resistance is shown at 18. The value of capacitor 16 and inductor 17 will be selected so as to present a low impedance to another characteristic harmonic such as, for example, the seventh harmonic. Finally, filter 10 comprises capacitor 19 and inductor 20 whose resistance is shown at 21. Any number of these filters may be provided by appropriately selecting the values of the capacitor 19 and inductor 20 so as to present a low impedance to a specific characteristic harmonic frequency. Finally, high pass filter 11 consists of capacitor 22 in series with the parallel combination of resistor 23 and inductor 24. These components are selected so as to present a low impedance to all frequencies above a certain selected harmonic.

As was pointed out above, the harmonic filter as explained thus far is well known in the art and does not form the present invention. The present invention resides in providing the additional filter shown generally at 12. The filter 12 is similarly constructed with a capacitor 25 in series with an inductor 26 whose resistance is shown generally at 27. Capacitor 25 and inductor 26 are selected so as to present a low impedance to a specific noncharacteristic harmonic frequency at which parallel resonance may be expected. Hence, in one application, the system dynamics were such that the system could be expected to go into parallel resonance at approximately a fourth harmonic frequency, and capacitor 25 and inductor 26 were selected to filter out that noncharacteristic harmonic. In addition, a resistor 28 in series with a blocking filter shown generally at 29 is connected in parallel with the inductor 26. The blocking filter 29 comprises a parallel combination of capacitor 30 and inductor 31.

The purpose of the resistor 28 is to diminish the effects of a parallel resonant condition by damping the noncharacteristic harmonic component of system voltage that tends to be produced by the interaction of noncharacteristic harmonic components of current in the associated conductor and a high impedance resulting from resonance between the system inductance 2 and the capacitive impedance of the conventional harmonic filters. The blocking filter 29 will minimize losses in the resistor 28 at the system fundamental frequency since the capacitor 30 and inductor 31 are selected so as to present a high impedance at this particular frequency.

From the foregoing, it can be seen that the primary effect of the filter 12 is to shunt out a predictable resonant frequency. In addition, the effect of resistor 28 is to provide damping so as to diminish the effect of parallel resonance without untoward losses at system fundamental frequency. While the system shown in FIG. 1 shows resistor 28 and blocking filter 29 connected in parallel with a conventional C filter, it should be pointed out that these components could be connected directly to the power line itself and provide essentially similar results. However, the connection shown in FIG. 1 appears to be preferable to a direct connection across the AC line because the connection shown enhances the sensitivity of resistance 28 to currents occurring at an expected parallel resonant frequency as well as further minimizing the effect of resistor 28 at system fundamental frequency.

Resistor 28 and blocking filter 29 could be connected across the inductor in one of the LC shunt filters already provided, such as filter 8. However, such a connection would be less desirable than that shown in the preferred embodiment of FIG. 1 since it would decrease the efficiency of the filter 8 to suppress its characteristic harmonic frequency. In addition, the effect of resistor 28 at noncharacteristic harmonics would also be lessened.

As was pointed out above, the system also includes some means 7a, 7b, 7c for correcting the system power factor. Referring specifically to power factor correction 7a, there is shown a series of static capacitors 32, 33, 34 and 35 which can be connected to the system by means of switches shown at 36, 37, 38, 39. Since the parallel resonant condition results from placing capacitance in parallel with the system inductance and thereby presenting a high impedance at certain noncharacteristic harmonic frequencies, it is obvious that the switching of power factor capacitors may similarly cause the system to go into parallel resonance. However, if the system is equipped with filter 12, the effect of resistance 28 is to provide damping and hence filter 12 may also be utilized to diminish the effect of a parallel resonance which occurs as a result of providing static capacitors for power factor correction.

Turning now to FIG. 2 there is shown a similar power system including the AC system 1, the system inductance 2, converter 3, and harmonic filters 6a, 6b, 6c. These parts correspond to similarly designated parts in FIG. 1. The converter 3 is here shown as a transformer 40 and a bridge 44. The transformer 40 has a three-phase primary 41 connected to the AC conductors A, B, C, a set 42 of secondary windings connected to the bridge 44, and a tertiary winding 43. In this embodiment, the filters 6a, 6b, 6c are not directly connected to each phase of the system as was the case in the embodiment shown in FIG. 1, but instead they are operatively connected to the AC conductors by way of tertiary windings 43a, 43b and 43c of transformer 40. In certain applications, it may be desirable to connect the power system filtering to a transformer of this type since the tertiary windings could operate at a lower voltage and therefore allow for the use of cheaper components in the power system filter. This advantage is in part offset by the additional cost of the transformer. In addition, the effectiveness of the filtering may be reduced because of the reduced coupling which results from connecting the filters via the transformer 40 rather than by connecting them directly as shown in FIG. 1.

While particular embodiments of the invention have been shown and described, it will be obvious to those skilled in the art that various changes and modifications may be made without departing from this invention in its broader aspects. It is, therefore, intended that the appended claims shall cover all such changes and modifications as shall fall within the true spirit and scope of the invention.

I claim:

1. In a polyphase electric power system comprising a plurality of conductors which have a certain inductance and are adapted to be energized by alternating current which may have both characteristic and noncharacteristic harmonic components, and a plurality of series resonance characteristic harmonic filters operatively coupled to said conductors, the improvement comprising: an additional filter comprising comprising impedance element operatively connected to said conductors and designed to damp the noncharacteristic harmonic component of system voltage produced by the interaction of the noncharacteristic harmonic component of current and a high impedance resulting from a condition in which said inductance and the impedance of said harmonic filters resonate.

2. The power system improvement recited in claim 1 wherein said impedance element comprises a resistor.

3. The power system improvement recited in claim 2 wherein a blocking filter tuned to the fundamental frequency of said current is connected in series with said resistor.

4. The power system improvement recited in claim 3 wherein said blocking filter comprises an inductor and a capacitor connected in parallel relation.

5. In a harmonic filter for connection to the lines of a polyphase power system, the lines having an inherent inductance and being fed by a source of current having both characteristic and noncharacteristic components and wherein said harmonic filter comprises a plurality of shunt filters individually tuned to shunt certain predetermined characteristic harmonic frequencies, the improvement comprising an additional shunt filter operatively connected to said power lines to provide damping at resonant harmonic frequencies which are noncharacteristic.

6. The harmonic filter improvement recited in claim 5 wherein said additional shunt filter includes the series combination of a resistor and means for presenting high impedance to current of fundamental frequency and relatively low impedance to current of said resonant, noncharacteristic harmonic frequencies.

7. The harmonic filter improvement recited in claim 6 wherein said additional filter also comprises a capacitor and an inductor, the latter being connected in series relationship with said capacitor and in parallel relationship with said series combination.